US012333773B2

(12) United States Patent
Bakker et al.

(10) Patent No.: US 12,333,773 B2
(45) Date of Patent: Jun. 17, 2025

(54) EXPLAINING A MODEL OUTPUT OF A TRAINED MODEL

(71) Applicant: KONINKLIJKE PHILIPS N.V., Eindhoven (NL)

(72) Inventors: Bart Jacob Bakker, Eindhoven (NL); Dimitrios Mavroeidis, Utrecht (NL); Stojan Trajanovski, London (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 500 days.

(21) Appl. No.: 17/797,775

(22) PCT Filed: Feb. 7, 2021

(86) PCT No.: PCT/EP2021/052895
§ 371 (c)(1),
(2) Date: Aug. 5, 2022

(87) PCT Pub. No.: WO2021/160539
PCT Pub. Date: Aug. 19, 2021

(65) Prior Publication Data
US 2023/0052145 A1   Feb. 16, 2023

(30) Foreign Application Priority Data
Feb. 10, 2020   (EP) .................................. 20156426

(51) Int. Cl.
*G06V 10/25*   (2022.01)
*G06N 3/08*    (2023.01)
(Continued)

(52) U.S. Cl.
CPC ............. *G06V 10/25* (2022.01); *G06N 3/08* (2013.01); *G06V 10/454* (2022.01);
(Continued)

(58) Field of Classification Search
CPC .... G06V 10/25; G06V 10/454; G06V 10/464; G06V 10/764; G06V 10/82; G06V 2201/03; G06N 3/08
(Continued)

(56) References Cited

U.S. PATENT DOCUMENTS

2019/0221313 A1   7/2019 Rim
2019/0236782 A1   8/2019 Guy

FOREIGN PATENT DOCUMENTS

WO   WO2019171227 A1   9/2019

OTHER PUBLICATIONS

Grad-CAM++: Improved Visual Explanations for Deep Convolutional Networks Aditya Chattopadhyayâ, Anirban Sarkar, Member, IEEE, Prantik Howlader, and Vineeth N Balasubramanian, Member, IEEE Abstract (Year: 2018).*

(Continued)

*Primary Examiner* — Stephen P Coleman

(57) ABSTRACT

The invention relates a computer-implemented method (500) of generating explainability information for explaining a model output of a trained model. The method uses one or more aspect recognition models configured to indicate a presence of respective characteristics in the input instance. A saliency method is applied to obtain a masked source representation of the input instance at a source layer of the trained model (e.g., the input layer or an internal layer), comprising those elements at the source layer relevant to the model output. The masked source representation is mapped to a target layer (e.g., input or internal layer) of an aspect recognition model, and the aspect recognition model is then applied to obtain a model output indicating a presence of the given characteristic relevant to the model output of the trained model. As explainability information, the characteristics indicated by the aspect recognition models are output.

14 Claims, 5 Drawing Sheets

(51) Int. Cl.
    G06V 10/44    (2022.01)
    G06V 10/46    (2022.01)
    G06V 10/764   (2022.01)
    G06V 10/82    (2022.01)
(52) U.S. Cl.
    CPC .......... *G06V 10/464* (2022.01); *G06V 10/764* (2022.01); *G06V 10/82* (2022.01)
(58) Field of Classification Search
    USPC ........................................................ 382/155
    See application file for complete search history.

(56) References Cited

OTHER PUBLICATIONS

PCT International Search Report, International application No. PCT/EP2021/052895, May 12, 2021.
Selvaraju R. et al., "Grad-CAM: Visual Explanations from Deep Networks via Gradient-Based Localization", 2017 IEEE International Conference on Computer Vision ( I CCV). IEEE, Mar. 21, 2017, pp. 618-626, XP033282917.
Sola P. et al., "Image-to-Image Translation with Conditional Adversarial Networks", arxiv.org, Cornell University Library, 201 Olin Library Cornell University Ithaca, NY 14853, Nov. 21, 2016, XP080733474.
Ronneberger O. et al., "U-Net: Convolutional Networks for Biomedical Image Segmentation", MICCAI 2015, Part III, LNCS 9351, pp. 234-241, 2015.
Kingma D.P. et al., "Adam: A Method for Stochastic Optimization", Computer Science, Machine Learning, 3rd International Conference for Learning Representations, San Diego, 2015, arxiv.org/abs/1412.6980.
Zhou B. et al., "Learning Deep Features for Discriminative Localization", 2016 IEEE Conference on Computer Vision and Pattern Recognition (CVPR), arxiv.org/abs/1512.04150, CVPR, Dec. 2016.
Zeiler M.D. et al., "Visualizing and Understanding Convolutional Networks", Computer Vision and Pattern Recognition (cs.CV), arxiv.org/abs/1311.2901, ECCV, Nov. 2013.
Irvin J. et al., "CheXpert: A Large Chest Radiograph Dataset with Uncertainty Labels and Expert Comparison", Computer Vision and Pattern Recognition (cs.CV), The Thirty-Third AAAI Conference on Artificial Intelligence (AAAI-19), pp. 590-597, 2019.
Yuan J. et al., "Automatic Radiology Report Generation Based on Multi-View Image Fusion and Medical Concept Enrichment", Medical Image Computing and Computer Assisted Intervention—MICCAI 2019. Lecture Notes in Computer Science( ), vol. 11769, Springer, Cham, Oct. 10, 2019.
Chattopadhyay A. et al., "Grad-CAM++: Improved Visual Explanations for Deep Convolutional Networks", Proceedings of IEEE Winter Conference on Applications of Computer Vision (WACV2018), arXiv:1710.11063 [cs.CV], Nov. 2018.
Springenberg J.T. et al., "Striving for Simplicity: The All Convolutional Net ", 3rd International Conference on Learning Representations, ICLR 2015, San Diego, CA, USA, May 7-9, 2015, Workshop Track Proceedings, (2015).
Krizhevsky A. et al., "ImageNet Classification with Deep Convolutional Neural Networks", Advances in Neural Information Processing Systems 25 (NIPS 2012).

* cited by examiner

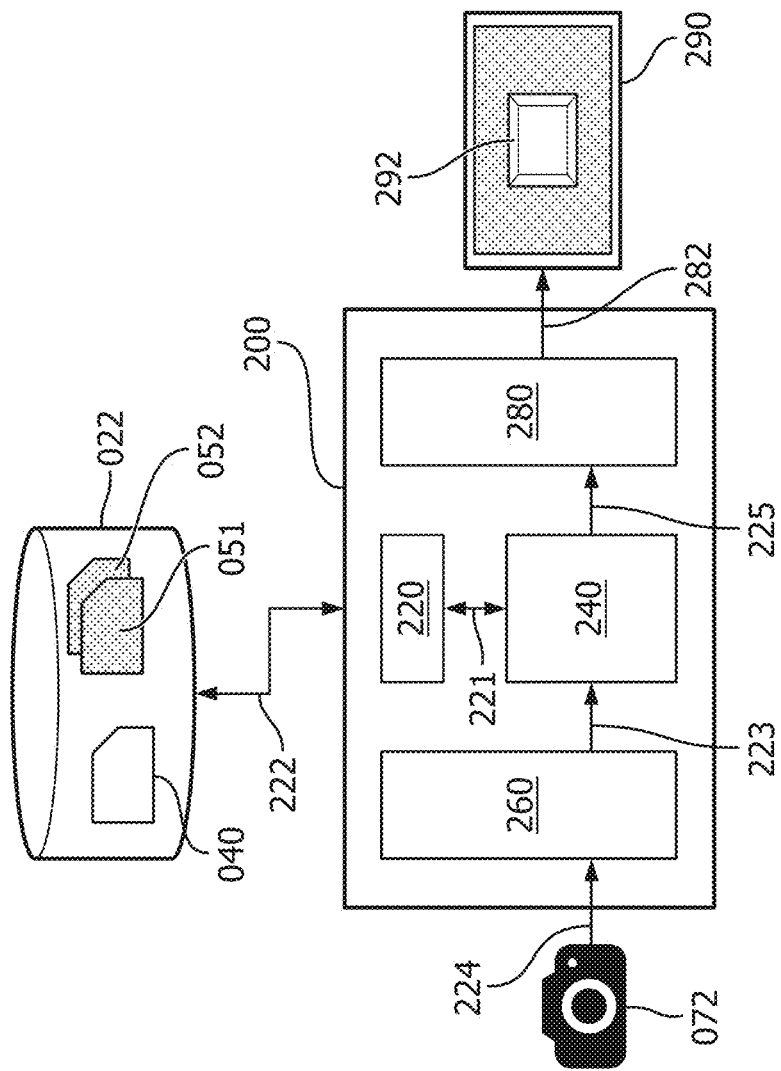
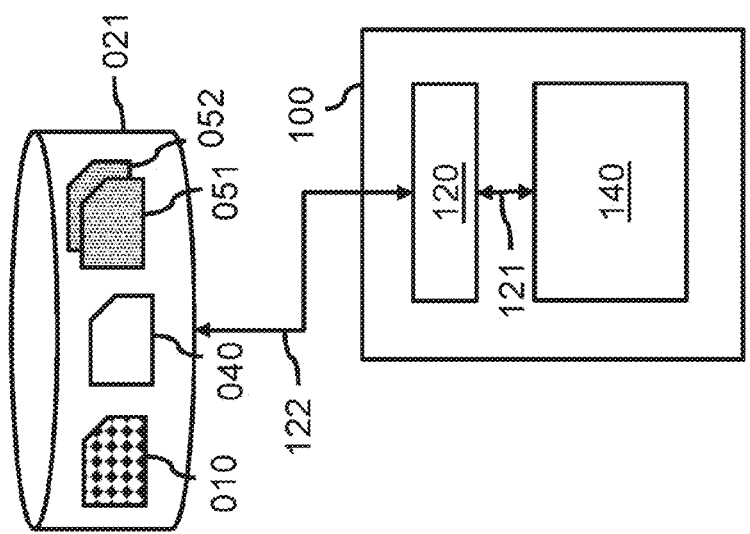

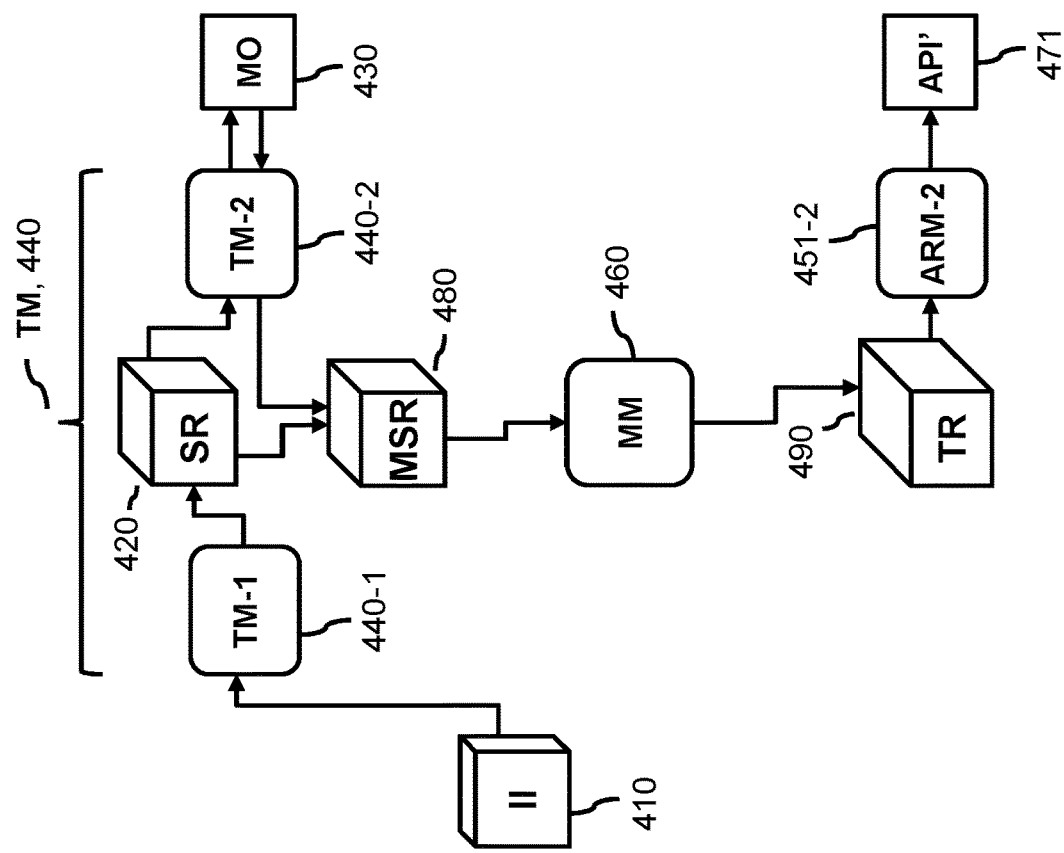
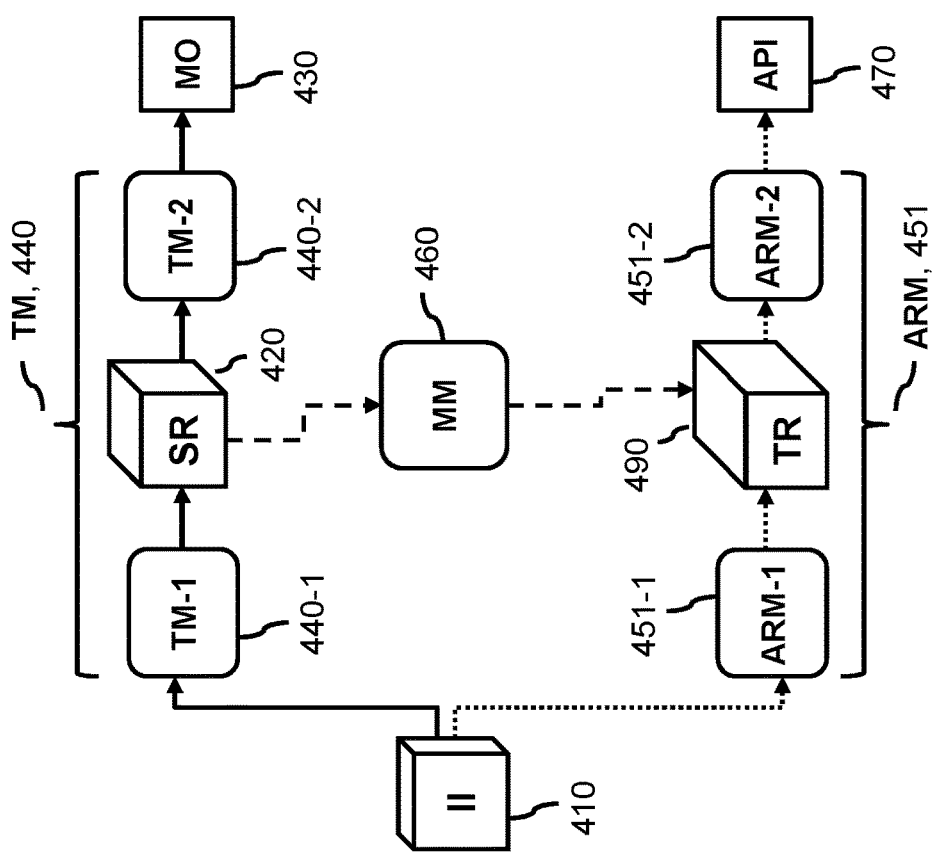
Fig. 4b
Fig. 4a

EXPLAINING A MODEL OUTPUT OF A TRAINED MODEL

CROSS-REFERENCE TO PRIOR APPLICATIONS

This application is the U.S. National Phase application under 35 U.S.C. § 371 of International Application No. PCT/EP2021/052895, filed on Feb. 7, 2021, which claims the benefit of European Patent Application No. EP20156426.7, filed on Feb. 10, 2020. These applications are hereby incorporated by reference herein.

FIELD OF THE INVENTION

The invention relates to a computer-implemented method of generating explainability information, and to a corresponding system. The invention further relates to a computer-implemented method of enabling such generation, and a corresponding system. The invention further relates to a computer-readable medium.

BACKGROUND OF THE INVENTION

Deep learning methods have a proven record of accomplishment in generating useful, high level features out of very low-level data, such as the colour values of single pixels in a medical image. This eliminates the labour-intensive need to handcraft such features, and allows for the automatic definition of yet unknown features. Generally, deep learning concerns the use of machine-learnable models with multiple neural network layers, e.g., an input layer at which an input instance to the model is presented, one or more internal layers by which the input instance is processed, and an output layer representing a model output, e.g., a classification, a regression, an image caption, a visual question answering output, etcetera. The learned features are typically defined through a large set of weights in a deep neural network. Typically, earlier layers of a model recognize more localized and/or low-level features whereas later layers recognize more high-level features. The model output can e.g. be based on a weighted combination of high-level features.

A primary application of deep learning techniques is image analysis, medical or otherwise. Medical image analysis is used in areas like radiology and digital pathology, e.g., a trained model may be used to detect a clinical condition such as a malignant tumour. In such cases, the result of applying the model may be used to flag images for review by a clinician, for example, or to otherwise support the decision-making of the clinician. This is a prime example of an application where it is important not just to get the final model output by a trained model, but also to understand how the model arrived at its output.

Deep neural network-type models by themselves however are usually too large to be understood well by humans, and instead function largely as black boxes. This makes it hard to explain how a deep network functions and why it makes the decisions that it makes. However, techniques are known that can provide an explanation of a model output, for example, in the form of highlighting parts of the image that the model used in determining the output. Due to this highlighting, for example, the clinician can more quickly confirm whether the model output was correct and is supported in making their own assessment by being pointed towards parts of the image that are likely to be relevant. For example, in a tumour board meeting where multiple clinicians come together to discuss often complex cases for which a lot of information is available, getting feedback of which parts of an image the trained model considers to be relevant can be a useful tool to help the people focus on the most important information, even regardless of whether the actual model output of the trained model is actually used or not. Generally, explanations of model outputs have various other uses, including for model debugging and for further automated processing, as discussed in more detail elsewhere in this specification. Such explanation maps known in the literature as saliency maps, pixel-attribution maps, attribution maps, or sensitivity maps.

A technique to produce visual explanations for decisions from deep neural networks, in this case from a class of convolutional neural network (CNN)-based models, is known from "Grad-CAM: Visual Explanations from Deep Networks via Gradient-based Localization" by R. Selvaraju et al. (available at https://arxiv.org/abs/1610.02391 and incorporated herein by reference). The gradients of any target concept flowing into the final convolutional layer of the model are used to produce a coarse localization map, of the same size as the convolutional maps at that layer, highlighting the important regions in the image for predicting the concept. The localization map is upsampled to the input image resolution and then combined with a fine-grained visualization to get a so-called "Guided Grad-CAM" visualization explaining the decision of the model.

SUMMARY OF THE INVENTION

In accordance with a first aspect of the invention, a computer-implemented method of generating explainability information for explaining a model output of a trained model is described, as defined by claim 1. In accordance with a further aspect of the invention, a computer-implemented method of enabling generation of explainability information for a trained model is described, as defined by claim 12. In accordance with another aspect of the invention, a system for generating explainability information for explaining a model output of a trained model is described, as defined by claim 13. In accordance with a further aspect, a system for enabling generation of explainability information for a trained model is described, as defined by claim 14.

Various embodiments involve determining an explanation of a model output of a trained model for an input instance. For example, the model output can be a classification of an image by a convolutional neural network (CNN), a prediction of a regression model, etc. The model output can also be an image, e.g. in case the trained model is an image-to-image translation model or a segmentation model. The trained model can also be part of a larger model, with the model output based on one or more outputs of internal neurons of the larger model. This way, the behaviour of internal neurons of the larger model may be explained. The determination of explanations of model output is known per se, e.g., visualization methods such as Grad-CAM can show the location in an image of those features that are most important in generating the model output.

As the inventors realized, however, the explanations given by current techniques may not be sufficiently informative, in particular to domain experts. Current visualization methods for images can highlight parts of an input image that are used by a model to determine the model output, but these parts are typically a mix of many separate cues. Existing visualization methods are also sometimes used to visualize parts of an input image relevant for particular high-level features of the model, but also in this case, high-level features of the model are not necessarily features that are recognized as such by a domain expert. For example, the features may be abstract features that are useful for the model to determine its output but much less so for a domain expert to interpret the image and reach their own conclusion. The same principle applies when using the visualization, e.g., the determined mask, for further automated processing: the parts of the image most useful for such processing may not correspond to the parts of the image relevant for the trained model to determine its model output.

Accordingly, the inventors envisaged to make explanations of model outputs more informative by providing techniques to explain them in terms of the presence of a given set of potentially relevant characteristics. Generally, a characteristic may be any aspect of which it is possible to indicate a presence in the input instance. For example, a characteristic can be any particular type of object that can be present at a particular location in the input instance (e.g., a cyst, a tumour, a cell nucleus, a lymphocyte, a necrotic tissue, etc.), or a particular characteristic that an object present in the input instance may have (e.g., dark, noisy, spiky, etc.). The presence of the characteristic can also be amount of presence in the input instance overall or at respective positions in the input instance (e.g., a cell or nucleii density, a perfusion in tissue, etc.). The characteristics may be selected because of their expected relevance to the model output, e.g., manually by domain experts, automatically by correlating model outputs with characteristic presences, etc. The words "aspect" and "characteristic" will be used interchangeably throughout this specification.

In order to be able to provide feedback for the model in terms of these potentially relevant characteristics, various embodiments make use of aspect recognition models for these respective characteristics. In many cases, these aspect recognition models can be trained and used completely independently from the trained model. An aspect recognition model for a particular characteristic may be configured to indicate a presence of that characteristic in an input instance (typically, the same type of input instance as for the trained model itself). In its most basic form, an aspect recognition model can provide an overall indication of the presence of the characteristic, e.g., of whether or not, or to what extent, the characteristic is present in the input instance. For example, the aspect recognition model can be configured to determine whether or not a cyst is visible in an input image. An aspect recognition model can also indicate where in the input instance the given characteristic is present, e.g., by indicating a part of the input instance representing the characteristic in various ways that are known per se, e.g., by means of a segmentation or a bounding box.

As the inventors realized, presence indicators by aspect recognition models may provide a particularly appealing way to provide information about input instances, either to a user or to another system component. For example, in many application domains, semantic segmentation models are applied successfully in practice to highlight which pixels of an image belong to a certain characteristic, e.g., to assign pixels to a particular object or characteristic. Similarly, in many applications, localization and detection models are used successfully to draw bounding boxes in images indicating where in an image an object or characteristic resides. In many cases, given a presence indicator of an aspect recognition model, a user is able to see very quickly whether or not the presence is correctly indicated or not, instead of, e.g., having to scan a full image for presence of the characteristic. Thus, by applying aspect recognition models to indicate presence of characteristics that are were relevant for the trained model in determining its model output, an informative and intuitive way of explaining the model output may be obtained.

Unfortunately, when applied to the input instance itself, an aspect recognition model would just indicate the presence of the characteristic in the input instance, regardless of the model output. Interestingly, however, the inventors envisaged to use a saliency method to link the presence indication of the aspect recognition model to the model output of the trained model. The saliency method may determine a masked representation of the input instance, representing those elements of the input instance relevant to the model output. This representation will be referred to throughout this specification as a "source" representation. The saliency method will be described in greater detail below; for now, Guided Grad-CAM can be taken as an example. The source representation may be mapped to the aspect recognition model, thereby obtaining what will be referred to throughout this specification as a "target" representation. The aspect recognition model can then be applied to the target representation, thus obtaining a presence indicator that indicates a presence of the characteristic in the input instance insofar as it is relevant to the model output. In that sense, the presence indicator provides an explanation of the model output in terms of that characteristic.

Accordingly, given one or more aspect recognition models for various characteristics that may contribute to the model output, e.g., aspect recognition models for indicating cell nuclei, lymphocytes, necrotic tissue, etcetera, their respective presence insofar as relevant for the model output may be determined in three main steps. First, use a Grad-CAM-like methods to identify source features that contribute most to the model output of the trained model. Second, map the source features to the aspect recognition model. Finally, apply the aspect recognition model to the target features in the regular way. The generated output indicates those characteristics that contribute most to the trained model's output. These presence indications can then be output, e.g., highlighted in one or more copies of an input instance. This way, an explanation of the model output can be provided in terms of concepts that are useful beyond the trained model itself to understand why a particular model output belongs to a certain input instance.

For example, various embodiments enable the visualization of relevant characteristics in such a way that AI specialists, but especially also application domain specialists such as medical specialists, are able to analyse them, since they are recognized and expressed in medical terms. For example, this may allow more efficient medical decision making, but can also allow the trained model to be refined further, e.g., based on observing unwanted features (indicating a model that is overfitted or has learned e.g. hospital-specific features) or based on observing that one or more relevant characteristics are not used (e.g., indicating that the model should be re-trained with additional training data directed to those characteristics).

For example, as a saliency method, the Guided Grad-CAM method of Selvaraju et al. may be used. This method operates on images and, like several alternatives discussed throughout this specification, determines a saliency map at the input layer of the neural network. Thus, the masked source representation of the input image can be obtained by determining the saliency map for the input image at the input layer using Guided Grad-CAM or a similar saliency method, and then masking the input image by the saliency map to obtain the masked source representation. This masked source representation can then be identity mapped to the input layer of an aspect recognition model by setting the masked target representation to be equal to the masked source representation, at which point the aspect recognition model can be applied to the masked target representation to obtain a presence indication for the characteristic.

In preferred embodiments, however, the source layer at which the source representation of the input instance is defined, is an internal layer of the trained model. Likewise, the target layer at which the target representation of the input instance is defined, may be an internal layer of the aspect recognition model. The use of internal layers is particularly beneficial since later layers of the model typically represent the information that the model relied on to produce a model output is in a more compressed form and/or at a more abstract level than at the input layer. For example, particular nodes or groups of nodes at a layer of the neural network may represent particular semantic concepts that the model has recognized. For example, a particular shape or combination of shapes may be used as a cue for increased blood thickness, which may then be used in determining a model output, e.g., presence of a clinical indication.

Thus, as a consequence of using internal layers, the information that is mapped to the target layer of the aspect recognition model may better semantically represent the information used by the model to determine a model output, or in other words, may provide a more accurate signal for use by the aspect recognition model to recognize characteristics. Another way of looking at this is that, the more layers there are between the model output and the layer at which the masked source representation is determined, the more information may be lost in the saliency method by going back from the model output to that layer. Accordingly, by using internal layers, it may be possible to go back far enough so that sufficiently low-level information is available to recognize the presence of characteristics of the input instance, but not so far that accurate detection of the characteristics is prevented. Which internal layers to use is also discussed elsewhere in this specification.

When using internal layers, several options are available for obtaining a target representation for the input instance to which an aspect recognition model can be applied. In some embodiments, the target representation can be obtained by applying a mapping model between the source and target layers. For example, the mapping model for an aspect recognition model may be trained to produce latent representations for that aspect recognition model given latent representations of the trained model. Accordingly, the mapping model can be trained so as to find a mapping that provides the most accurate conversion between the latent representations. For example, when the source and target layers are convolutional layers, an accurate mapping model can be obtained by using image-to-image translation model such as a U-net model, as known in the art per se, allowing to exploit the spatial correspondence properties of the convolutional layers. Other types of mapping model are also possible depending on the type of model used, as long as there is sufficient mutual information between source and target representations of an input instance. In particular, the combination of using internal layers of the trained model and aspect recognition models, and having a mapping model them, has the advantage that such a model can be easier to train, e.g., because it gets a more high-quality input signal in which different features of the input instance are already distinguished.

Another appealing option for obtaining a target representation, is to have the target layer of the trained model and preceding layers be shared with an aspect recognition model. In this case, the target representation and the source representation may coincide, e.g., the identity mapping is used to obtain the target representation. For example, the trained model and one, more, or all aspect recognition models may share a number of convolutional layers, after which one or more additional layers are used by their respective models to reach their respective model outputs. The models can be jointly trained to obtain the parameters of the shared layers. Accordingly, a particularly good alignment between the trained model and the aspect recognition models can be obtained. However, using shared layers is of course not always possible, e.g., in case pre-existing models are used.

Concerning the characteristics for which aspect recognition models can be used, generally, any characteristic whose presence can be indicated may be used. In fact, the techniques herein are typically agnostic of the semantic contents of the various characteristics. Instead, the various characteristics may be selected by a user, and the aspect recognition models may be trained based on user annotations of input instances. For example, depending on the aspect recognition model, a user may indicate whether the characteristic is present, provide a bounding box for the characteristic, highlight pixels of an image belonging to the characteristic, or provide an amount of presence of the characteristics for pixels of the image.

Although in typical embodiments, the techniques provided herein may be applied to images, also other types of sensor data are possible, e.g., obtained from a sensor. In particular, an input instance may represent a time series of one or more sensor measurements. In both cases, convolutional-type models can be used that typically preserve a correspondence between representations of the input instance at respective layers, e.g., spatial correspondence in the case of images, or temporal correspondence in the case of time series. To such data, known saliency techniques may be readily applied.

Optionally, the trained model may be a medical image classification model for detecting a clinical indication. The aspect recognition model may be in this case be configured to indicate presence of respective contributory factors to the clinical indication. Examples of such clinical indications (in other words, clinical characterizations or clinical findings) include tumour grades and Gleason scores. The contributing factors may be particular objects or other aspects of input images that a clinician may use to signal such a clinical indication. Accordingly, the clinician can get an explanation of why a clinical indication was detected in terms of the contributing factors that he/she use himself/herself, allowing the clinician more easily check whether the model output is correct or make their own assessment.

Optionally, one or more aspect recognition models for respective characteristics may be configured to indicate a part of the input instance representing the characteristic. For example, an aspect recognition model may provide, per feature of the input instance (e.g., per pixel), an indication whether the feature belongs to the characteristic. If a per-feature indication (e.g., per pixel) is given, such a model is generally referred to as a semantic segmentation model, or simply a segmentation model. The indication can also be given as a bounding box. Such models are often called localization models. An aspect recognition model may also be able to provide multiple presence indications of multiple objects, in some cases even of multiple types of characteristic; such models are also known as detection models. Optionally, the aspect recognition model is configured to indicate, for respective parts of the input instance, respective amounts of presence of the characteristic.

Optionally, the characteristics indicated to be present may be highlighted in the input instance in a sensory perceptible manner to a user. For example, the input instance may be shown or visualized on a screen, with characteristics indicated by an aspect recognition model highlighted, e.g. a bounding box or other polygon drawn around a region of the input instance representing the characteristic, or a segmentation model shown alongside the input instance or used to filter the input instance by. Accordingly, the model output of the trained model may be explained to a user.

The explanation of the model output may also be automatically processed. For example, the input instance may be annotated with characteristics indicated by the aspect recognition model, e.g., in the form of the model outputs of these models. The annotation can be in the form of yes/no-flags in the metadata of the input instance, or by storing coordinates of the bounding box, etcetera. In various embodiments, for multiple input instances having the same model output, a count is determined of a number of times a characteristic is indicated to be present. Accordingly, statistics can be obtained of which characteristics are used over many input instances to reach a certain model output, e.g., a certain classification. Such reporting provides valuable debugging information about the model that can be used for example to refine the model design or its training dataset. Annotating input instances by their characteristics also allows to determine outliers, for example, input instances that are uncommon in the combination of characteristics used to determine a given model output. These outliers can for example be further analysed to find potential misclassifications, or areas of the input space underrepresented in the training dataset.

Optionally, when using a mapping model to map an internal source layer to an internal target layer, the choice of source layer, target layer, and/or mapping model may be made automatically. To this end, multiple mapping models for respective layers of the trained model and/or of the aspect recognition model may be trained. A mapping model of the multiple trained mapping models may be selected based at least in part on performance of the multiple trained mapping models on a test dataset, e.g., in terms of accuracy of the mapping model to map the source layer to the target layer. In particular, the choice of layer may represent a trade-off between preserving as much information of the model output by selecting a later layer, and obtaining information at a sufficiently low level to allow the aspect recognition model to work and/or to preserve sufficient correlation between the source and target layers. By training the multiple mapping models, an optimal selection may be made.

It will be appreciated by those skilled in the art that two or more of the above-mentioned embodiments, implementations, and/or optional aspects of the invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which:

FIG. 1 shows a system for enabling to explain model outputs of a trained model;

FIG. 2 shows a system for explaining a model output of a trained model for an input instance;

FIG. 4a shows a detailed example of how to train a mapping model for mapping a source representation of a trained model to a target representation of an aspect recognition model, thereby enabling to explain model outputs of the trained model;

FIG. 4b shows a detailed example of how to use a mapping model and an aspect recognition model to determine a presence of an aspect relevant to model output of a trained model, thereby explaining the model output;

It should be noted that the figures are purely diagrammatic and not drawn to scale. In the figures, elements which correspond to elements already described may have the same reference numerals.

DETAILED DESCRIPTION OF EMBODIMENTS

Figure 3A:
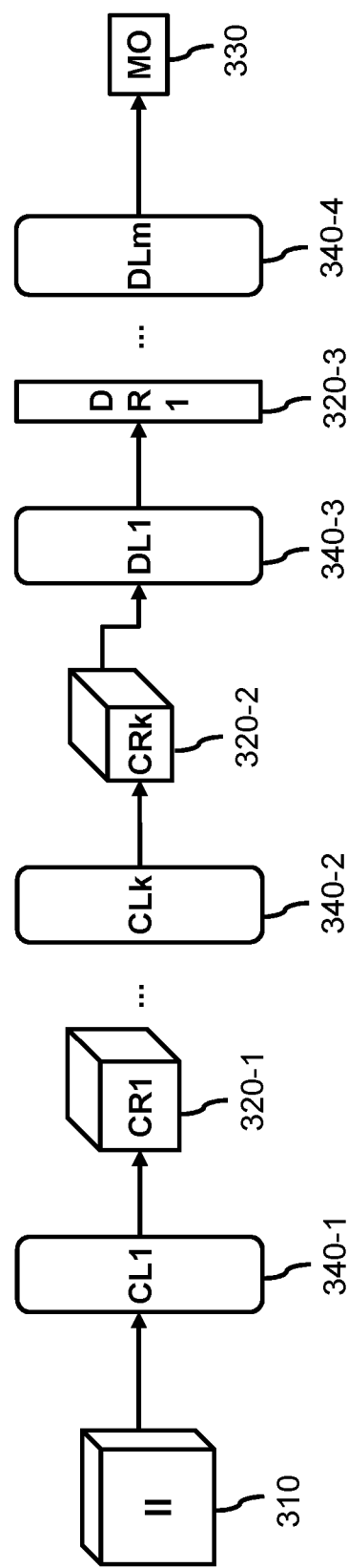
FIG. 3a shows a detailed example of a model for use as a trained model or aspect recognition model; in this case, a convolutional network.

FIG. 1 shows a system 100 for enabling generation of explainability information for a trained model. The system 100 may comprise a data interface 120 and a processor subsystem 140 which may internally communicate via data communication 121. Data interface 120 may be for accessing a trained model 040 configured to determine a model output for an input instance. The trained model may comprise at least a source layer. The source layer may be an input layer or an internal layer. An example of a trained model is described with respect to FIG. 3a. Data interface 120 may be for accessing one or more aspect recognition models for respective characteristics of input instances of the trained model. By way of example, two aspect recognition models 051, 052 are shown although it is also possible to use one, at least three, or at least five aspect recognition models, for example. An aspect recognition model 051, 052 may be configured to indicate a presence of the characteristic in an input instance. The aspect recognition model 051, 052 may comprise at least a target layer. The target layer may be an input layer or an internal layer. An example of an aspect recognition model is described with respect to FIG. 3b. Data interface 120 may be for accessing a training dataset 010 comprising multiple training instances.

The trained model 040, aspect recognition models 051, 052, and/or mapping models trained by system 100 may be for use to explain a model output of a trained model, e.g., according to a method described herein, e.g., by system 200 of FIG. 2. System 100 may itself be used to explain model outputs of trained models, e.g., systems 100, 200 may be combined into a single system.

The processor subsystem 140 may be configured to, during operation of the system 100 and using the data interface 120, access data 010, 040, 051-052. For example, as shown in FIG. 1, the data interface 120 may provide access 122 to an external data storage 021 which may comprise said data 010, 040, 051-052. Alternatively, the data may be accessed from an internal data storage which is part of the system 100. Alternatively, the data may be received via a network from another entity. In general, the data interface 120 may take various forms, such as a network interface to a local or wide area network, e.g., the Internet, a storage interface to an internal or external data storage, etc. The data storage 021 may take any known and suitable form.

Processor subsystem 140 may be configured to, during operation of the system 100 and using the data interface 120, train mapping models between the trained model 010 and the one or more aspect recognition models 051-052. A mapping model between the trained model 010 and an aspect recognition model 051-052 may be trained. To this end, for a training instance of the training dataset 040, the trained model 010 may be applied at least in part to the training instance to determine a source representation of the training instance at the source layer of the trained model 010. Further, the aspect recognition model 051, 052 may be applied at least in part to the training instance to determine a target representation of the training instance at the target layer of the aspect recognition model. The mapping model may be trained to output the target representation given the source representation. An example of training a mapping model is discussed with respect to FIG. 4a.

As an optional component, the system 100 may comprise an image input interface or any other type of input interface (not shown) for obtaining sensor data from a sensor, such as a camera. Processor subsystem 140 may be configured to obtain one or more training instances of the training dataset based on sensor data obtained via the sensor interface. The input interface may be configured for various types of sensor signals, e.g., video signals, radar/LiDAR signals, ultrasonic signals, etc.

Various details and aspects of the operation of the system 100 will be further elucidated with reference to FIGS. 3-5, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

FIG. 2 shows a system 200 for explaining a model output of a trained model for an input instance. The system 200 may comprise a data interface 220 and a processor subsystem 240 which may internally communicate via data communication 221. Data interface 220 may be for accessing a trained model 040 configured to determine a model output for an input instance. The trained model 040 may comprise at least a source layer. The source layer may be an input layer or an internal layer. Instead or in addition, data interface 220 may be for accessing one or more aspect recognition models for respective characteristics of input instances of the trained model. By way of example, the figure shows two aspect recognition models 051, 052, but it is also possible to have, e.g., one, three, or more aspect recognition models. An aspect recognition model for a given characteristic may be configured to indicate a presence of the characteristic in an input instance. The aspect recognition model may comprise at least a target layer. The target layer may be an input layer or an internal layer. The trained model 040 and/or aspect recognition models 051, 052, and/or any mapping models used by system 100 may be obtained from a system for enabling to explain model outputs of a trained model, e.g., system 100 of FIG. 1.

The processor subsystem 240 may be configured to, during operation of the system 200 and using the data interface 220, access data 040, 051, 052. For example, as shown in FIG. 2, the data interface 220 may provide access 222 to an external data storage 022 which may comprise said data 040, 051, 052. Alternatively, the data may be accessed from an internal data storage which is part of the system 200. Alternatively, the data may be received via a network from another entity. In general, the data interface 220 may take various forms, such as a network interface to a local or wide area network, e.g., the Internet, a storage interface to an internal or external data storage, etc. The data storage 022 may take any known and suitable form.

Processor subsystem 240 may be configured to, during operation of the system 200 and using the data interface 220, obtain an input instance. Processor subsystem 240 may further apply the trained model 040 to the input instance to obtain a model output. This may comprise obtaining a source representation of the input instance at the source layer of the trained model. Processor subsystem 240 may further apply a saliency method to obtain a masked source representation of the input instance at the source layer of the trained model comprising elements of the source representation relevant to the model output. For an aspect recognition model for a given characteristic, e.g., model 051 or 052, processor subsystem 240 may map the masked source representation to the target layer of the aspect recognition model 051, 052, to obtain a target representation for the input instance at the target layer. Processor subsystem 240 may apply the aspect recognition model 051, 052 for the given characteristic to the target representation to obtain a model output indicating a presence of the given characteristic relevant to the model output of the trained model. Examples of determining such model outputs are discussed with respect to FIGS. 4b, 5b.

Processor subsystem 240 may output, as the explainability information, the characteristics indicated to be present by the applied aspect recognition models 051, 052. Although the characteristics are in many cases output along with the model output of the trained model, this is not needed. For example, the characteristics may be highlighted, e.g., their locations in the input instances shown, in a sensory perceptible manner to a user. For example, a graphical user interface may show the parts of the input instance where relevant characteristics were recognized, overlayed on the input instance with a label, e.g., using a colour coding or other encoding to identify the type of characteristic, in other words, to identify which aspect recognition model recognized the characteristic. Outputting the characteristics may also be in the form of annotating the input instance with said indicated characteristics, e.g., storing the input instance along with the annotation(s) using data interface 220. As another example, for multiple input instances (e.g. multiple images) having the same model output, a number of times a characteristic is indicated to be present may be counted and reported, e.g., to another processor subsystem or to the user.

As an optional component, the system 200 may comprise an image input interface 260 or any other type of input interface for obtaining sensor data 224 from a sensor, such as a camera 072. Processor subsystem 240 may be configured to determine the input instance from the sensor data 224. For example, the camera may be configured to capture image data 224, processor subsystem 240 being configured to obtain the image data via data communication 223 and use it as input instance. The input interface may be configured for various types of sensor signals, e.g., video signals, radar/LiDAR signals, ultrasonic signals, etc. The input instance may comprise a time series of such sensor measurements, for example.

As an optional component, the system 200 may comprise a display output interface 280 or any other type of output interface for outputting the characteristics indicated to be present by the applied object recognition models 051, 052 to a rendering device, such as a display 290. For example, the display output interface 280 may generate display data 282 for the display 290 which causes the display 290 to render the indicated characteristics in a sensory perceptible manner, e.g., as an on-screen visualisation 292.

Various details and aspects of the operation of the system 200 will be further elucidated with reference to FIGS. 3-5, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 200 may also be implemented in a distributed manner, e.g., involving different devices or apparatuses, such as distributed servers, e.g., in the form of cloud computing.

FIG. 3a shows a detailed, yet non-limiting, example of a model for use as a trained model or aspect recognition model. The model shown in this figure is a convolutional network, also known as a convolutional neural network. The model determines a model output MO, 330, for an input instance II, 310. For example, input instance II may be an image, e.g., represented as a M×N×c-sized matrix, where the number of channels c can be c=1 in case of a greyscale image, c=3 in case of an RGB image, etcetera. The described techniques are not limited to images though, e.g., other types of sensor data such as a time series of sensor measurements are also possible. In some cases, such other sensor data, e.g., recorded sound data, may be represented as an image for processing as described herein. Although the explanation here focusses on 2D data, e.g., images, also 1D-data, 3D data, etc. can be processed by convolutional networks.

The model output MO may represent one or more values, e.g., classification scores for one or more classes in the case of a classification model, a prediction of a quantity in the case of a regression model, etc. The model output can also be an image, e.g., in the case of an image-to-image translation model or segmentation model. The trained model can be part of a larger model (not shown in this figure), in which case the model output can be the activation of a particular internal neuron of the larger model, or a combination of activations of multiple internal neurons, such as a sum or average. Accordingly, characteristics influencing internal neurons of the larger model may be studied.

Generally, the term convolutional network may be used to refer to any neural network that comprises at least one convolutional layer. Various architectures for convolutional networks are known and can be applied. As an illustrative example, a convolutional network architecture is shown that comprises a convolutional part followed by a dense part. The convolutional part comprises one or more layers CL1, 340-1, up to CLk, 340-2. The first layer may process input instance II into a first convolutional representation CR1, 320-1 that can then be input into a second layer, etcetera. The final layer CLk of the convolutional part may then output a convolutional representation CRk, 320-2, of the input instance II. The layers of the convolutional part can for instance be convolutional layers, pooling layers, ReLU layers, etc. For example, the convolutional part may comprise one or more groups each comprising a convolutional layer, followed by a ReLU layer, followed by an optional pooling layer. For example, the number of convolutional layers may be at least five, or at least ten.

The layers of the convolutional part may generate more and more abstract representations of the input instance. A representation of the input instance II at such a layer, in other words, the set of values output at that layer by the neural network given the input instance, typically preserves a spatial correspondence with the input instance, e.g., a M×N×c-sized input may be represented at a layer by a M'×N'×c'-sized volume, where the pixels (x', y',·) correspond to the original input pixels (x, y,·), but typically at a different resolution; and the feature vectors (·,·, c') per pixel replace the original feature vector (·,·, c) of the input pixels. In many cases, subsequent convolutional layers may have decreasing spatial dimensions so that output CRk of the convolutional part has spatial dimensions M'×N' smaller than the input instance. A M'×N'-sized slice of an internal layer volume typically represents an output of a so-called filter applied to the values at the previous layer. For example, the number of filters at a layer can be at most or at least 8, at most or at least 32, or at most or at least 128.

A second part of the convolutional network may determine the model output MO based on the output CRk of the convolutional part of the network. The example shows a second part comprising one or more fully connected, or "dense", layers. Shown in the figure are dense layers DL1, 340-3, up to DLm, 340-4. Generally, in such layers, the input instance II is represented as a feature vector, which may be facilitated, e.g., by reshaping a feature image output by the convolutional part, and/or by a repetition of cropping and resolution decrease on the original input instance II. In some cases, a single dense layer suffices, but the number of dense layers can also be bigger, e.g., at least three or at least five.

Figure 3B:
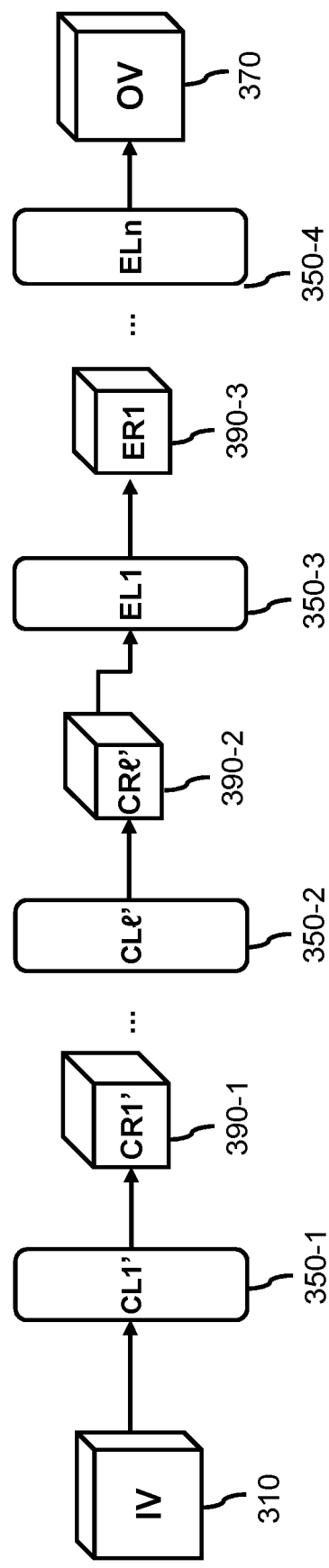
FIG. 3b shows a detailed example of a model for use as a trained model, aspect recognition model, or mapping model; in this case, a fully convolutional network.

FIG. 3b shows another detailed, yet non-limiting, example of a model for use herein. The model shown in this figure is a so-called fully convolutional network. Such a model transforms an input instance in the form of an input volume IV, 310, e.g., an input image, into a model output in the form of an output volume OV, 370, in a sequence of layers that each preserve a spatial correspondence with the input instance, e.g., convolutional layers, pooling layers, and ReLU layers. For example, the output volume OV may represent a segmentation of an input image II, or, more generally, the model may be trained to perform any kind of image-to-image translation.

As illustrated in the figure, a fully convolutional network may comprise a contracting part and an expansive part. The contracting part may comprise one or more layers, e.g., layers CL1', 350-1, up to CL$\ell$', 350-2, that produce respective representations CR1', 390-1 up to CL$\ell$', 390-2, of the input instance II of which the respective spatial dimensions are smaller than or equal than that of the preceding layers (although the depth, e.g., the number of filters, can increase). Accordingly, the result of the contracting part may be a representation CL$\ell$' of the input instance of reduced spatial dimensions. After the contracting part, an expansive part may be applied, e.g., comprising layers EL1, 350-3, up to ELn, 350-4, resulting in respective representations of the input instance. For example, layer EL1 may result in representation ER1, 390. The final layer of the expansive part may result in output volume OV. Generally, subsequent layers of the expansive part may result in respective representations with equal of increasing spatial dimensions, so that output volume OV has greater spatial dimensions than representation CL$\ell$'. To increase spatial dimensions, for example, upsampling layers can be used. In various applications, such as semantic segmentation, output volume OV may be configured to have the same spatial dimensions as the input volume IV; however, this is not necessary. Models comprising a contracting and an expansive part may be generally referred to as encoder-decoder models.

In particular, in various embodiments, one or more respective layers of the contracting part of the model may be connected with one or more respective layers of the expansive part of the model via so-called skip connections. For example, the connected layers may be of the same spatial dimensions, e.g., M×N×$c_1$ and M×N×$c_2$, respectively. In a skip connection, the outputs of the contractive and expansive representations may be concatenated, e.g., to obtain a M×N×($c_1$+$c_2$)-sized output to be processed further in the network. The contractive and expansive representations do not need to be of the same size, e.g., the smaller representation may be rescaled to match the larger representation or the other way around, e.g., by pooling or by repeating pixels.

Generally, such models with contracting and expansive parts and skip connections may be referred to as U-net models since their architectures can be visualized as a U shape, in which the layers of the contracting part form the left part and the layers of the expansive part form the right part. Various such models are known per se and can be applied here. An example of a U-net model is presented in O. Ronneberger et al., "U-Net: Convolutional Networks for Biomedical Image Segmentation" (available at https://arxiv.org/abs/1505.04597 and incorporated herein by reference). Another known example is the so-called ResNet, or Residual Network.

FIGS. 4a-4b demonstrate explainability techniques using a mapping model. An input instance II, 410, may be processed by a trained model TM, 440, to obtain a model output MO. FIG. 4b shows a detailed, yet non-limiting example of how an aspect presence indicator API', 471, indicating a presence of a given characteristic relevant to the model output MO, can be determined. To this end, a saliency method may be used to obtain, at a layer of the trained model, a masked source representation MSR, 480, of the input instance II comprising elements of the input instance at that layer of the trained model relevant to the model output MO. The masked source representation MSR may then be mapped to a target layer of an aspect recognition model ARM, 451, for the given characteristic. By recognizing the characteristic in the masked source representation, which contains information from the input instance relevant to the model output MO, the aspect recognition model may indicate a presence of the given characteristic which is relevant to the model output MO. FIG. 4a shows a detailed, yet non-limiting example of how such a mapping model MM, and/or the trained model TM and aspect recognition model ARM, may be trained.

Shown in the figures is a trained model TM, 440, configured to determine a model output MO, 430, for an input instance II, 410. Similarly to FIG. 3a, input instance II may be an image, sensor data represented as an image, or various other kinds of data. In various embodiments, model TM can be a classification model. In this case, model output MO may represent one or more classification scores for respective classes into which the input instance II may be classified, e.g., one, two, or more classes. Various other types of model outputs MO are also possible, e.g., a prediction of a quantity in case the model is a regression model; a caption in case of a captioning model, an answer in case of a visual question answering model, etc. For example, trained model TM may be trained for classification of malignant versus benign tumours; for tumour grading or prognosis, etc. The model output MO can also be an output volume, e.g., an output image, e.g., in the case of an image-to-image translation model, a segmentation model, etc.

Generally, trained model TM can be any kind of model for which it is possible to apply a saliency method to determine source representation elements, at the input layer or an internal layer of the model, relevant to the model output MO. For example, trained model TM can be a neural network, such as a convolutional network as discussed with respect to FIG. 3a or FIG. 3b. An appropriate type of trained model may be chosen based on the type of input instance and/or model output. The trained model TM and other trained models described herein are typically parameterized by a set of parameters, e.g., weights of nodes in the case of a neural network. For example, the number of layers of the model may be at least 5 or at least 10, and the number of nodes and/or weights may be at least 1000 or at least 10000. It is beneficial from the point of view of efficiency of training to use models amenable to gradient-based optimization, e.g., that are continuous and/or differentiable in its set of parameters.

Also shown in the figures is an aspect recognition model ARM, 451. As illustrated in FIG. 4a, when applied to an input instance II of the trained model TM, aspect recognition model ARM may be configured to determine an aspect presence indicator API, 470, indicating a presence of a given characteristic in the input instance II. The characteristic that model ARM can recognize can be an object or other characteristic of the input instance that is expected to be potentially relevant to the model output MO of the trained model TM, e.g., as chosen by a domain expert. It will be explained with respect to FIG. 4b how the aspect recognition model ARM can be used in combination with trained model TM to obtain an aspect presence indicator API' that does not indicate any presence of the given characteristic, but that specifically outputs a presence of the given characteristic relevant to the model output MO of the trained model.

Similarly to trained model TM, any type of aspect recognition model ARM can be used that is able to determine an aspect presence indicator API of the given type and that has an input or internal layer as used below. Several types of aspect presence indicator and possible corresponding aspect recognition models ARM are now discussed.

In some embodiments, aspect recognition model ARM may indicate whether or not the characteristic is present in the input instance II, e.g., without indicating any particular part of the input instance representing the characteristic. For example, such an aspect recognition model ARM can be trained as a binary classifier, with labels indicating whether or not the characteristic is present in respective input instances, or as a one-class classifier. For example, an aspect recognition model of this type can be a convolutional network, e.g., as in FIG. 3a.

In some embodiments, aspect recognition model ARM may indicate a part of the input instance II representing the characteristic. Such an aspect recognition model may be referred to generally as a segmentation model. As a specific example, the aspect recognition model ARM may return a map indicating, for separate pixels of an input image, whether or not that pixel belongs to the characteristic or not. Such a model is sometimes called semantic segmentation models. For example, a fully connected network can be used in this case, e.g., as in FIG. 3b. The model may also indicate an amount or degree of presence per part of the input instance, e.g., per pixel of an input image, for example, as a value in the domain [0,1].

The model ARM may also indicate a part of the input instance II in the form of coordinates of a bounding box, e.g., the model may be a localization or detection model. Also for these cases, various architectures can be used as known per se, including convolutional networks.

Also shown in the figures is a mapping model MM, 460, between a source layer of the trained model TM and a target layer of the aspect recognition model ARM. The source and target layers can be input or internal layers of their respective model. If the source and target layers are input layers, then the mapping model MM is optional, and instead, the identity mapping (or another given mapping, e.g., from colour to greyscale) from the source to the target layer can be used.

Generally, the source layer may be defined by dividing the trained model TM into a first part TM-1, 440-1, before the source layer (which may be empty if the source layer is the input layer) and a second part TM-2, 440-2, after the target layer. Accordingly, generally, trained model TM may be configured to determine model output MO by applying first part TM-1 of the trained model to an input instance II to obtain source representation SR, 420, of the input instance II at the source layer, and applying second part TM-2 to source representation SR to obtain model output MO. For example, if the convolutional network of FIG. 3a is used as trained model, then representation CRk of FIG. 3a may be used as source representation, or a representation at an earlier layer of the convolutional part. Masked source representation MSR, e.g., can be a M'×N'×c'-sized volume comprising c' filter outputs of size M'×N'.

Similarly, the target layer may be defined by dividing the aspect recognition model ARM into a first part ARM-1, 451-1 (which may be empty if the target layer is the input layer), and a second part ARM-2, 451-2, the model being configured to determine aspect presence indicator API by determining target representation TR of an input instance II at the target layer of the aspect recognition model by applying first part ARM-1 and then determining the aspect presence indicator API therefrom by applying second part ARM-2. For example, if the fully convolutional network of FIG. 3b is used as an aspect recognition model, a layer from the expansive part of the network may be used.

Concerning the selection of which source layer and which target layer to use, there are several preferred choices. Generally, since a mapping model is to be learned from the source layer to the target layer, sufficiently strong mutual information between the source representation SR and target representation TR of a given input instance II needs to be available. On the other hand, the features represented at the source and target layers need to be sufficiently abstract, and preferably also at a similar level of abstraction, in order for the mapping model to be efficiently trainable. Accordingly, preferably, the source and target layers have the at least approximately the same dimensions, e.g., equal dimensions or with at most a factor two difference in width and height. For the source and target layers to have the same level of abstraction, it is preferable that they have similar amounts of preceding layers, e.g., the same amount differing by at most two or at most four. For a desirable amount of abstraction, it is preferable to choose layers relatively far into the convolutional part of the neural network, e.g., choosing the final convolutional layer of the source or target model, or at most two or at most four layers preceding the final convolutional layer.

Instead of relying on a manual choice, it is also possible to determine which source or target layers to use by model selection. To this end, e.g., multiple mapping models may be trained for respective layers of the trained model TM and/or of the aspect recognition model ARM. Mapping model MM may then be selected among the multiple trained mapping models based at least in part on performance of the multiple trained mapping models on a test dataset, e.g., the ability to map the source layer to the target layer. Accordingly, the desirability of having an accurate mapping model, which may generally favour the use of source and target layers that occur earlier in their respective models, may be balanced with the desirability of having more abstract representations of the input instance, which may favour using later layers. For example, deepest source and target layers satisfying a minimum performance threshold of the mapping model may be selected.

Generally, any model architecture suitable for transforming the source representation SR to the target representation TR may be used. Specifically, in preferred embodiments the source and target layers are convolutional layers, in which case the mapping model MM may be an image-to-image translation model as known per se. For example, model MM may be a segmentation model, e.g., convolutional architectures such as the U-net model can be used, e.g., as in FIG. 3b. To use such model architectures as a mapping model, the model may be trained by minimizing an error of reconstructing the target layer representation, e.g., using a sum-squared error or the like. It is noted that, although many image-to-image translation models are typically applied in practice to input and output images that have low-dimensional feature vectors per pixel, e.g., one or three (colour for the input, object class or colour for the output), such models may be readily applied to source/target representations with more filters, e.g., at least ten or at least twenty.

The training of trained model TM, mapping model MM, and/or an aspect recognition model ARM is illustrated by the solid, dotted, and dashed lines in FIG. 4a. Generally, the models can be trained independently from each other, by the same system or by different systems. The models can also be trained on different or the same datasets. The trained model TM and aspect recognition mode ARM need to be already trained at the point where mapping model MM is trained.

Typically, training is performed using stochastic approaches such as stochastic gradient descent, e.g., using the Adam optimizer as disclosed in Kingma and Ba, "Adam: A Method for Stochastic Optimization" (available at https://arxiv.org/abs/1412.6980 and incorporated herein by reference). As is known, such optimization methods may be heuristic and/or arrive at a local optimum. Generally, the training of a model may comprise applying the model to be trained on one or more inputs to obtain respective outputs; deriving a training signal from an error derived from the output; and adjusting parameters of the model according to the training signal. Training may be performed instance-by-instance or in batches, e.g., of at most or at least 64 or at most or at least 256 instances.

Generally, the trained model TM may be trained on a dataset comprising multiple training input instances II and corresponding training model outputs MO, the model TM being trained to reproduce respective training model outputs MO given respective training instances II. The aspect recognition model ARM may be trained on a dataset comprising multiple training input instances II and corresponding aspect presence indicators API, the model ARM being trained to reproduce respective training model aspect presence indicator API given respective training instances II.

Given trained model TM and trained aspect recognition model ARM for a given characteristic, the mapping model MM may be trained on a training dataset comprising multiple training instances II. Interestingly, these training instances do not need to be labelled, for example, input instances for which no model output MO and/or aspect indications API are available can still be used to train the mapping model. The mapping model MM may be trained to best reproduce target representation TR of input instances according to the aspect recognition model given source representation SR of the input instances according to the trained model. First part TM-1 of the trained model may be applied to the training instance TI to determine source representation SR; first part ARM-1 of the aspect recognition model ARM may be applied to the training instance II to determine target representation TR, and the mapping model MM may be trained to output the target representation given the source representation.

Proceeding now to the determination of the aspect presence indicator API' for a given model output MO illustrated in FIG. 4b. Given a trained mapping model MM, the aspect presence indicator API' can be obtained by first using a saliency method to determine a masked source representation MSR highlighting those elements of the representation SR of the input instance II at the source layer relevant to the model output; applying the mapping model MM to the masked source representation to obtain target representation TR for the input instance, representing at the target layer of the aspect recognition model those features relevant for recognizing the characteristic that were also relevant for determining model output MO; and applying the aspect recognition model ARM, in other words its second part ARM-2 mapping the target layer to the output layer, to the target representation TR to obtain aspect presence indicator API'.

To determine masked source representation MSR, various existing saliency methods may be used. Such saliency methods typically make use of the model output MO of applying the trained model TM to input instance II; and of the source representation SR, 320, of the input instance II at the source layer of the trained model.

Generally, the term "saliency method" may refer to a method to determine which elements of the source representation are relevant to the model output, e.g., to make a selection of a subset of source elements most relevant to the model output. In other words, a saliency method may determine a visual explanation of a decision of the trained model, by visualizing important regions of the input instance corresponding to a decision of interest by the model, e.g., regions whose values have a relatively big effect on, or provide a relatively big contribution to, the decision of the model to provide a particular model output. Various such explainability methods may be class-discriminative, e.g., producing different explanations for different outputs, and/or localized, e.g., providing explanations at a high level of detail, e.g., at the level of single input pixels or single features at a particular layer.

Many existing saliency methods are configured to determine a saliency map at the input layer of the trained model TM. For example, techniques that can determine an input-layer saliency map include: Guided Grad-CAM, as disclosed in Selvaraju et al., "Grad-CAM: Visual Explanations from Deep Networks via Gradient-based Localization" (available at https://arxiv.org/abs/1610.02391 and incorporated herein by reference); CAM, as disclosed in Zhou et al., "Learning Deep Features for Discriminative Localization" (available at https://arxiv.org/abs/1512.04150 and incorporated herein by reference); deconvolution, as disclosed in Zeiler et al., "Visualizing and understanding convolutional networks" (available at https://arxiv.org/abs/1311.2901 and incorporated herein by reference); and guided backpropagation, as disclosed in Springenberg et al., "Striving for Simplicity: The All Convolutional Net" (available at https://arxiv.org/abs/1412.6806 and incorporated herein by reference). Such saliency methods can be used to determine a masked source representation MSR at the input layer. Generally, such methods can be also be used to determine a masked source representation MSR at an internal layer by masking the input instance at the input layer with the input-layer mask and applying the trained model TM in part to obtain masked source representation MSR. Masked source representation MSR may also be obtained by applying a saliency method not to the full trained model TM but only to its second part TM-2, which may by itself be regarded as a model for determining model outputs MO from source representations SR.

For methods that directly determine a saliency map at the source layer, masked source representation can be obtained by masking source representation SR by the saliency map. Masking may be done, for example, by keeping elements of the source representation for which the saliency mask value (e.g., scaled to [0,1] with 1 indicating highest importance) exceeds a certain threshold, or by point multiplying with the saliency mask (e.g., scaled to [0,1] with 1 indicating highest importance).

Interestingly, in order to determine masked source representations MSR that are defined at an internal layer, and/or for models TM that output a model output image, various existing saliency methods can be adapted.

Specifically, Grad-CAM and CAM work by determining weights capturing the importance of respective filters k at a layer of a convolutional network, e.g., weights $a_k^c$ as discussed in Section 3 of "Grad-CAM: Visual Explanations from Deep Networks via Gradient-based Localization" and weights $w_k^c$ as discussed in Section 2 of "Learning Deep Features for Discriminative Localization". For saliency methods using weights of respective filters, masked source representation MSR may be determined from source representation SR by multiplying each element of the source representation by its weight.

In cases where the output of the trained model TM is an image, say of size R×S, Grad-CAM and similar techniques may be adapted by determining respective filter importance weights $a_k^c$ for respective output image pixels and combining them into a filter importance weight for the filter. For example, the combination can be a sum, a weighted sum, etc. For example, if the model output MO is a segmentation of an input image, then object pixels can be weighted stronger than background pixels. As a detailed example, for Grad-CAM, the formula for computing $a_k^c$ may be adapted to become $$a_k^c = \frac{1}{Z}\sum_i\sum_j\sum_r\sum_s dy_{r,s}^c/dA_{ij},$$

i.e., a sum of derivatives of the model output probability $y_{r,s}^c$ of a pixel being of class c, taken over all pixels in the output image.

The deconvolution technique of Zeiler provides an interpretation of feature activity at a given internal layer of a trained model by taking the initial part of the model preceding that internal layer and constructing a deconvolutional network, or deconvnet, for it. The deconvnet essentially reverses the operations of (the initial part of) the model by applying, in reverse order, layers that essentially undo the original operations. For a particular neuron at a given layer, the input pattern in an input instance causing the activation of that neuron is determined by setting all other neuron activations at that layer to zero, and using the deconvnet to map the representation back to the input space. The techniques of Zeiler may be adapted to determine a masked source representation MSR at a given layer of the trained model TM by taking the representation of the input instance at a later layer of the trained model, e.g., the last convolutional layer, and applying the deconvnet up to the layer at which the masked source representation is desired. In case the model output is an output volume such as an output image, the later layer can be the output layer. The result may be used to mask the representation of the input instance at that given layer, or may be used directly as a masked source representation. Similar, other deconvnets can also be applied from a later layer to the relevant layer.

Similarly to Zeiler's deconvolution technique, also Springenberg's guided backpropagation works by making a backward pass through a trained model. Accordingly, also in this case, a masked source representation at a given layer can be obtained by taking a representation at a later layer; using guided backpropagation to obtain a mask at the desired layer; and masking the representation of the input instance at that layer by the mask.

Figure 5B:
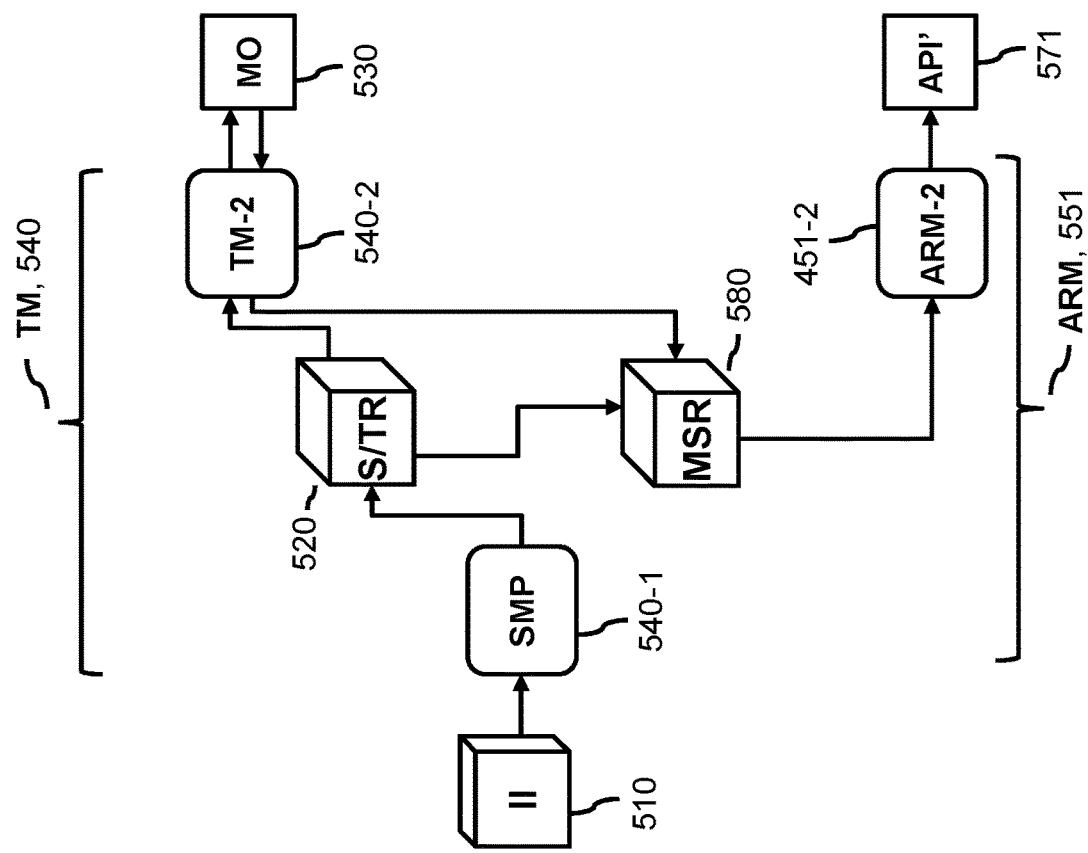
FIG. 5b shows a detailed example of how to use an aspect recognition model that shares internal layers with a trained model, to determine a presence of a characteristic relevant to model output of the trained model.
Figure 5A:
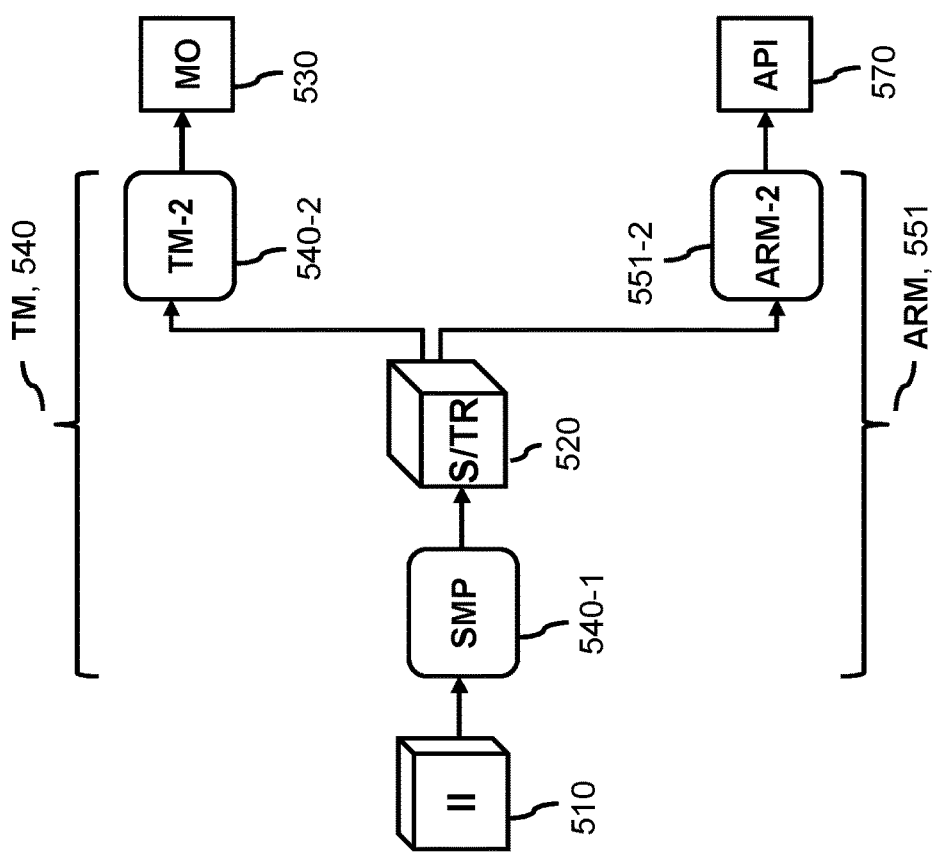
FIG. 5a shows a detailed example of a trained model and an aspect recognition model that share internal layers.

FIGS. 5a-5b illustrate the use of the techniques described herein in the case where the trained model and an aspect recognition model share a number of layers. FIG. 5a shows a detailed, yet non-limiting, example of the training of the trained model and aspect recognition model in this case. FIG. 5b shows a detailed, yet non-limiting, example of the determination of an aspect presence indicator in this case. This example builds on the example of FIG. 4a-4b and many implementation options described there, also apply here.

Shown in the figures is an input instance II, 510, and a trained model TM, 540, configured to determine a model output MO, 530, for the input instance II. Also shown is an aspect recognition model ARM, 551, configured to determine an aspect presence indicator API, 570, indicating a presence of a given characteristic in the input instance II.

Similarly to FIG. 4a-4b, also here trained model TM may determine model output MO by applying a first part of the trained model to the input instance to obtain a source representation at a source layer of the trained model, and applying a second part TM-2, 540-2, of the trained model to the source representation. Also similarly to FIG. 4a-4b, aspect recognition model ARM may determine aspect presence indicator API by applying a first part of the model ARM to obtain a target representation at a target layer of the aspect recognition model, and applying a second part of the model ARM to obtain the aspect presence indicator API. In embodiments illustrated in this figure, however, the first parts of the trained model TM and aspect recognition model ARM are shared among the models, as indicated by shared model part SMP, 540-1, in the figure. Accordingly, the shared model part SMP may result in a common source/target representation S/TR, 520, used by both the trained model TM and the aspect recognition model ARM to determine their respective outputs.

For example, both the trained model TM and the aspect recognition model ARM may be convolutional models, e.g., trained model TM can be a convolutional model as described with respect to FIG. 3a and/or aspect recognition model ARM can be a fully convolutional model as described with respect to FIG. 3b, etcetera. For example, all convolutional part layers can be shared, or a number of convolutional part layers can be shared, with the trained model TM and/or the aspect recognition model ARM having additional convolutional part layers apart from shared model part SMP. Many variations will be apparent to the skilled person.

For training the trained model and aspect recognition model, several options are available. One possibility is to obtain a pre-trained shared model part SMP, e.g., a pre-trained image feature extractor, e.g. Oxford University's VGG model. The trained model TM and the aspect recognition model ARM can then be trained separately based on the pre-trained shared model part SMP. It is also possible to jointly train the trained model TM and aspect recognition model ARM, including the shared model part.

For determining aspect presence indicator API' for model output MO, similarly to FIG. 4b, trained model TM may be applied to the input instance II to obtain the model output MO. To this end, shared model part SMP may be applied to obtain source/target representation S/TR at the source layer of the trained model TM, and second part TM-2 of the trained model TM may be applied to its result to obtain model output MO.

As in FIG. 4b, a saliency method may be applied to obtain a masked source representation MSR, 580, of the input instance at the source layer of the trained model comprising elements of the source representation S/TR relevant to the model output MO. Interestingly, because the source and target representations correspond because of the shared model part SMP, this representation can be mapped to the target layer of the aspect recognition model ARM in the form of an identity mapping. The result of this can be fed into second part ARM-2 of the aspect recognition model to obtain aspect presence indicator API' indicating a presence of the given characteristic relevant to the model output MO of the trained model TM.

Generally, FIGS. 4a-5b have focused on determining a single aspect presence indicator using a single aspect recognition model. In a typical use, there will be multiple aspect recognition models, e.g., at least five or at least ten. For each of those, the techniques described with respect to FIGS. 4a-5b may be separately applied. It is also possible to use aspect recognition models that can indicate presence of multiple characteristics and/or that can indicate multiple instances of characteristics of a given type in an input instance. For example, such models can assign pixels to respective characteristics or instances of a characteristic, or by returning multiple bounding boxes along with respective types of characteristic recognized. The techniques presented in FIGS. 4a-5b apply readily to these cases.

In particular, different aspect recognition models may use different model architectures and/or have different types of model outputs. For example, one or more aspect recognition models may be semantic segmentation models outputting a per-pixel mask, whereas one or more other aspect recognition models output bounding boxes of recognized characteristics. Also the target layers of the aspect recognition models that are used can be different, and for different aspect recognition models, different layers of the trained model may be used, as appropriate. It is also possible to mix the techniques of FIG. 4a-4b with those of FIG. 5a-5b, e.g., for one or more aspect recognition models, respective mapping models can be used whereas for one or more other aspect recognition models, a shared model part is used.

In various embodiments, the techniques described herein may be used in systems and methods for assisting a clinician in medical decision making. In such a case, the trained model may be a medical image classification model for detecting a clinical indication. Respective aspect recognition models may be configured to indicate presence of respective contributory factors to the clinical indication. In this case, the contributory factors that were found to be relevant to the model output of the trained model can provide useful feedback, e.g., that help the clinician(s) focus on the information that best helps them reach their own conclusion. For example, in a tumour board meeting or similar setting where multiple clinicians share their findings, there is typically a limited amount of time to go through a lot of information, such that pointing clinicians to relevant information is of particular importance.

Although the model output of the trained model may also be used by the clinician, interestingly, this is not needed; in fact, the actual model output of the trained model is in some cases not output at all, with the clues provided by the presence indicators being considered enough to support the clinician. For example, a segmentation map of clinically relevant aspects may be presented to the clinician for support.

As a concrete example, an input image may picture an organ of a patient, e.g., the lungs, and the clinical indication may be the presence of a malignant tumour. For example, the model output may indicate the presence of a malignant tumour, or may be a tumour grading. A potentially relevant characteristic for the detection of a malignant tumour can be the presence of nodules. Some nodules, however, are caused by an infection and do not necessarily indicate a malignant tumour. Accordingly, nodules that were used by the module to decide on the presence of the malignant tumour (if any) may be highlighted by an aspect recognition model, whereas other nodules may not. Another potentially relevant characteristic in this case may be an emphysema.

Generally, other types of relevant characteristics in medical image classification for which an aspect recognition model may be trained include the shape and density of cell nuclei, lymphocytes, presence of necrotic tissue and other tissue type related features. A good way to inventory such features is to listen as a clinical expert explains his/her analysis on a number of actual cases. Segmentation models that segment one or several such clinically relevant characteristics are known in the part per se.

It is not necessary in the medical decision-making context to use images, however. For example, an input instance may represent an EEG signal to be used, for example, in sleep staging. More generally, an input instance may represent a time series of physiological measurements. When presenting characteristics indicated to be present to the clinician however, also these types of input instances are typically visualized.

In various embodiments, the techniques described herein may be used in systems and methods for predictive maintenance of devices, e.g., medical devices. In predictive maintenance, a goal can be to predict a possible failure of the device. Models for predicting such a possible failure may take as input a multitude of different sources of information about the device, typically in the form of time-series data representing the state of the device. Indicating characteristics related to a prediction of a possible failure can help a user or another processor system to decide how to deal with the prediction, e.g., by indicating parts of the device that should be replaced or at least more closely inspected.

However, the techniques presented herein are not applicable just in the medical setting, e.g., also in autonomous driving or augmented reality, complex decision-making tasks are being performed by trained models and obtaining an understanding of how these trained models reach their decisions is highly relevant.

Figure 6:
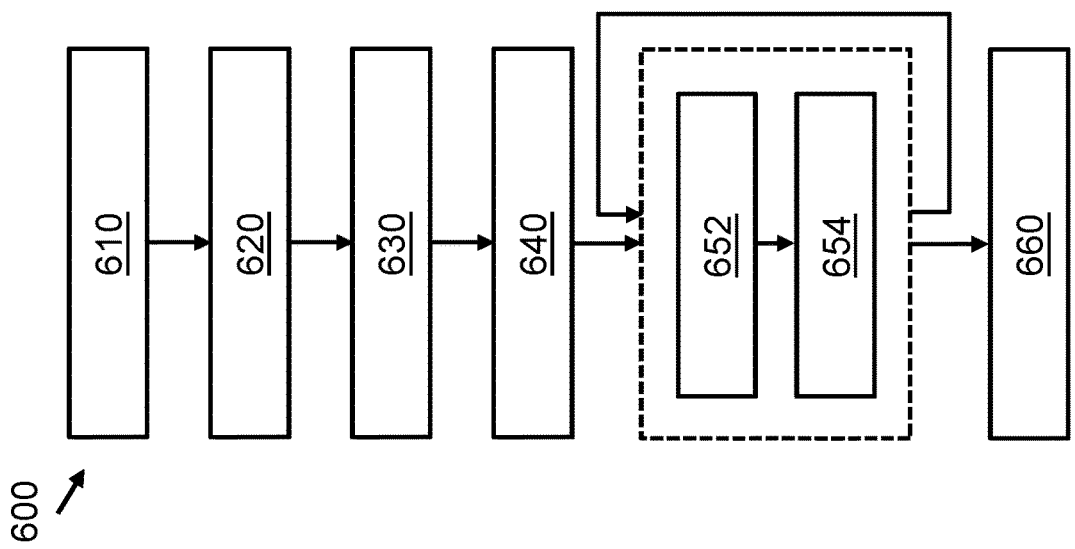
FIG. 6 shows a computer-implemented method of explaining a model output of a trained model for an input instance.

FIG. 6 shows a block-diagram of computer-implemented method 600 of generating explainability information for explaining a model output of a trained model. The method 600 may correspond to an operation of the system 200 of FIG. 2. However, this is not a limitation, in that the method 600 may also be performed using another system, apparatus or device.

The method 600 may comprise, in an operation titled "ACCESSING TRAINED MODEL, ASPECT RECOGNITION MODELS", accessing 610 various data. The data accessed in operation 610 may include a trained model configured to determine a model output for an input instance. The trained model may comprise at least a source layer. The source layer may be an input layer or an internal layer. The data accessed in operation 610 may further include one or more aspect recognition models for respective characteristics of input instances of the trained model. An aspect recognition model for a given characteristic may be configured to indicate a presence of the characteristic in an input instance. The aspect recognition model may comprise at least a target layer. The target layer may be an input layer or an internal layer. The method 600 may further comprise, in an operation titled "OBTAINING INPUT INSTANCE", obtaining 620 an input instance.

The method 600 may further comprise, in an operation titled "APPLYING TRAINED MODEL", applying 630 the trained model to the input instance to obtain a model output. The applying 630 may comprise obtaining a source representation of the input instance at the source layer of the trained mode (not shown as a separate operation).

The method 600 may further comprise, in an operation titled "APPLYING SALIENCY METHOD", applying 640 a saliency method to obtain a masked source representation of the input instance at the source layer of the trained model comprising elements of the source representation relevant to the model output.

The method may further comprise operations 652 and 654 being performed for one, multiple, or all aspect recognition models for respective given characteristics.

In operation 652 titled "MAPPING MASKED SOURCE REPRESENTATION TO TARGET LAYER", the masked source representation may be mapped to the target layer of the aspect recognition model to obtain a target representation for the input instance at the target layer. In operation 654 titled "APPLYING ASPECT RECOGNITION MODEL TO TARGET REPRESENTATION", the aspect recognition model for the given characteristic may be applied to the target representation to obtain a model output indicating a presence of the given characteristic relevant to the model output of the trained model.

The method 600 may further comprise, in an operation titled "OUTPUTTING ASPECT PRESENCE INDICATORS", outputting 660, as the explainability information, the characteristics indicated to be present by the applied aspect recognition models.

Figure 7:
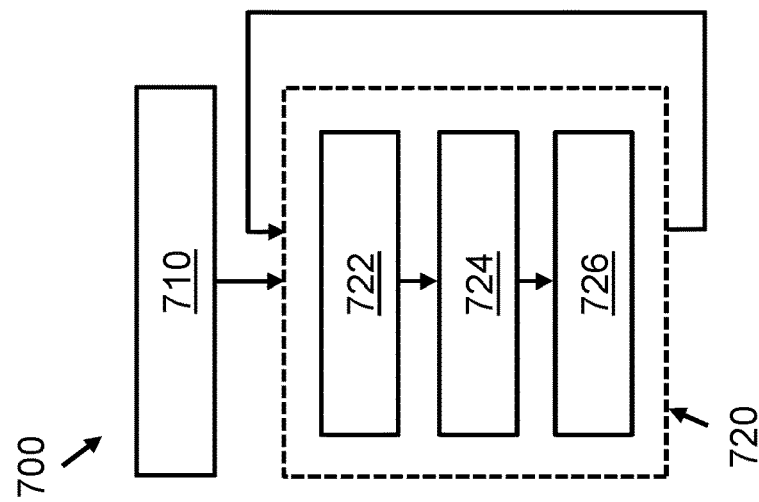
FIG. 7 shows a computer-implemented method of enabling to explain model outputs of a trained model.

FIG. 7 shows a block-diagram of computer-implemented method 700 of enabling generation of explainability information for a trained model. The method 700 may correspond to an operation of the system 100 of FIG. 1. However, this is not a limitation, in that the method 700 may also be performed using another system, apparatus or device.

The method 700 may comprise, in an operation titled "ACCESSING TRAINED MODEL, ASPECT RECOGNITION MODELS, TRAINING DATASET", accessing 710 various data. The data accessed in operation 710 may include a trained model configured to determine a model output for an input instance. The trained model may comprise at least a source layer. The source layer may be an input layer or an internal layer. The data accessed in operation 710 may further include one or more aspect recognition models for respective characteristics of input instances of the trained model. An aspect recognition model for a given characteristic may be configured to indicate a presence of the characteristic in an input instance. The aspect recognition model may comprise at least a target layer. The target layer may be an input layer or an internal layer. The data accessed in operation 710 may further include a training dataset comprising multiple training instances.

The method 700 may further comprise training mapping models between the trained model and the one or more aspect recognition models. A mapping model between the trained model and an aspect recognition model being trained 720 in an operation titled "TRAINING MAPPING MODEL", by for a training instance of the training dataset, performing several operations. Specifically, the method 700 may comprise, in an operation titled "APPLYING TRAINED MODEL TO DETERMINE SOURCE REPESENTATION", applying 722 the trained model at least in part to the training instance to determine a source representation of the training instance at the source layer of the trained model. The method 700 may further comprise, in an operation titled "APPLYING ASPECT RECOGNITION MODEL TO DETERMINE TARGET REPRESENTATION", applying 724 the aspect recognition model at least in part to the training instance to determine a target representation of the training instance at the target layer of the aspect recognition model. The method may also comprise, in an operation titled "TRAINING TO OUTPUT TARGET GIVEN SOURCE", training 726 the mapping model to output the target representation given the source representation.

It will be appreciated that, in general, the operations of method 600 of FIG. 6 and method 700 of FIG. 7 may be performed in any suitable order, e.g., consecutively, simultaneously, or a combination thereof, subject to, where applicable, a particular order being necessitated, e.g., by input/output relations. Some or all of the methods may also be combined, e.g., method 600 of explaining a model output may be applied subsequently to said explaining being enabled according to method 700.

Figure 8:
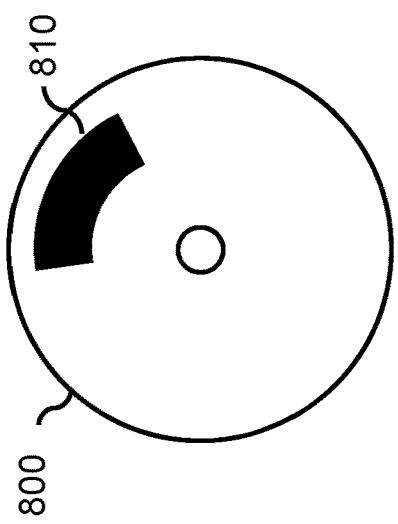
FIG. 8 shows a computer-readable medium comprising data.

The method(s) may be implemented on a computer as a computer implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing one or more respective mapping models between a trained model and one or more respective aspect recognition models for use in a computer-implemented method as described herein.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of generating explainability information for explaining a model output of a trained model being a neural-network type model, the method comprising:

accessing:

a trained model configured to determine a model output for an input instance, the trained model comprising at least a source layer, the source layer being an input layer or an internal layer of the trained model;

one or more aspect recognition models for respective characteristics of input instances of the trained model, an aspect recognition model for a given characteristic being configured to indicate a presence of the characteristic in an input instance, the aspect recognition model comprising at least a target layer, the target layer being an input layer or an internal layer of the aspect recognition model;

obtaining an input instance;

applying the trained model to the input instance to obtain a model output, said applying comprising obtaining a source representation of the input instance at the source layer of the trained model;

applying a saliency method to obtain, at the source layer, a masked source representation of the input instance of the trained model, the masked source representation comprising elements of the source representation relevant to the model output;

for an aspect recognition model for a characteristic:
mapping the masked source representation to the target layer of the aspect recognition model to obtain a target representation for the input instance at the target layer;
applying the aspect recognition model for the characteristic to the target representation to obtain a model output indicating a presence of the characteristic relevant to the model output of the trained model;

outputting, as the explainability information, the characteristics indicated to be present by the applied aspect recognition models.

2. The method of claim 1, wherein an input instance comprises at least one of an image and a time series of one or more sensor measurements.

3. The method of claim 1, wherein the trained model is part of a larger model, wherein one or more outputs of internal neurons of the larger model are being based on the model output of the trained model.

4. The method of claim 1, wherein applying the saliency method comprises:
determining a saliency map for the input instance at the source layer, the saliency map indicating, for respective elements of the source representation, a respective relevance of said element to the model output of the trained model for the input instance;
masking the source representation by the saliency map to obtain the masked source representation.

5. The method of claim 1, wherein the aspect recognition model for the characteristic is configured to indicate a part of the input instance representing the characteristic.

6. The method of claim 1, wherein mapping the masked source representation to the target layer of the aspect recognition model comprises applying a mapping model between the source layer of the trained model and the target layer of the aspect recognition model.

7. The method of claim 6, wherein the source layer of the trained model and the target layer of the aspect recognition model are convolutional layers, the mapping model comprising an image-to-image translation model, for example, a U-net model.

8. The method of claim 1, wherein the source layer of the trained model and layers preceding the source layer are shared with the aspect recognition model.

9. The method of claim 1, wherein outputting the characteristics indicated to be present comprises highlighting said characteristics in the input instance in a sensory perceptible manner to a user.

10. The method of claim 1, wherein outputting the characteristics indicated to be present comprises annotating the input instance with said indicated characteristics.

11. The method of claim 1, wherein the trained model is a medical image classification model for detecting a clinical indication, the aspect recognition model being configured to indicate presence of respective contributory factors to the clinical indication.

12. A computer-implemented method of enabling generation of explainability information for a trained model being a neural-network type model, comprising:
accessing:
a trained model configured to determine a model output for an input instance, the trained model comprising at least a source layer, the source layer being an input layer or an internal layer of the trained model;
one or more aspect recognition models for respective characteristics of input instances of the trained model, an aspect recognition model being configured to indicate a presence of the characteristic in an input instance, the aspect recognition model comprising at least a target layer, the target layer being an input layer or an internal layer of the aspect recognition model;
a training dataset comprising multiple training instances;
training mapping models between the trained model and the one or more aspect recognition models, a mapping model between the trained model and an aspect recognition model being trained by, for a training instance of the training dataset:
applying the trained model at least in part to the training instance to determine, at the source layer, a source representation of the training instance of the trained model;
applying the aspect recognition model at least in part to the training instance to determine a target representation of the training instance at the target layer of the aspect recognition model;
training the mapping model to output the target representation given the source representation.

13. A system for generating explainability information for explaining a model output of a trained model being a neural-network type model, the system comprising:
a data interface for accessing:
a trained model configured to determine a model output for an input instance, the trained model comprising at least a source layer, the source layer being an input layer or an internal layer of the trained model;
one or more aspect recognition models for respective characteristics of input instances of the trained model, an aspect recognition model for a given characteristic being configured to indicate a presence of the characteristic in an input instance, the aspect recognition model comprising at least a target layer, the target layer being an input layer or an internal layer of the aspect recognition model;
a processor subsystem configured to:
obtain an input instance;
apply the trained model to the input instance to obtain a model output, said applying comprising obtaining a source representation of the input instance at the source layer of the trained model;

apply a saliency method to obtain a masked source representation of the input instance at the source layer of the trained model, the masked source representation comprising elements of the source representation relevant to the model output;

for an aspect recognition model for a characteristic:

map the masked source representation to the target layer of the aspect recognition model to obtain a target representation for the input instance at the target layer;

apply the aspect recognition model for the characteristic to the target representation to obtain a model output indicating a presence of the characteristic relevant to the model output of the trained model;

outputting, as the explainability information, the characteristics indicated to be present by the applied aspect recognition models.

14. A system for enabling generation of explainability information for a trained model being a neural-network type model, the system comprising:

a data interface for accessing:

a trained model configured to determine a model output for an input instance, the trained model comprising at least a source layer, the source layer being an input layer or an internal layer of the trained model;

one or more aspect recognition models for respective characteristics of input instances of the trained model, an aspect recognition model being configured to indicate a presence of the characteristic in an input instance, the aspect recognition model comprising at least a target layer, the target layer being an input layer or an internal layer of the aspect recognition model;

a training dataset comprising multiple training instances;

a processor subsystem configured to:

train mapping models between the trained model and the one or more aspect recognition models, a mapping model between the trained model and an aspect recognition model being trained by, for a training instance of the training dataset:

applying the trained model at least in part to the training instance to determine, at the source layer, a source representation of the training instance of the trained model;

applying the aspect recognition model at least in part to the training instance to determine a target representation of the training instance at the target layer of the aspect recognition model;

training the mapping model to output the target representation given the source representation.

* * * * *